M. BUNYETIN.
TRACTION ENGINE.
APPLICATION FILED AUG. 24, 1908.
949,350.
Patented Feb. 15, 1910.
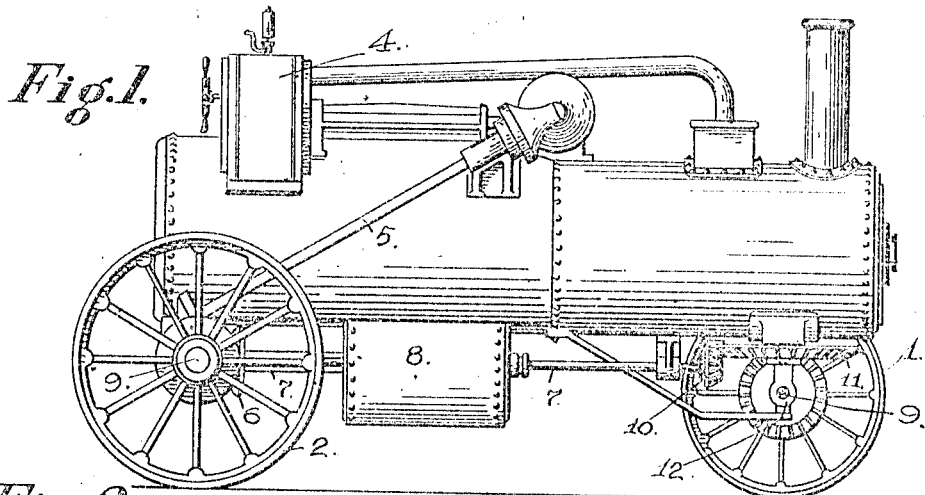
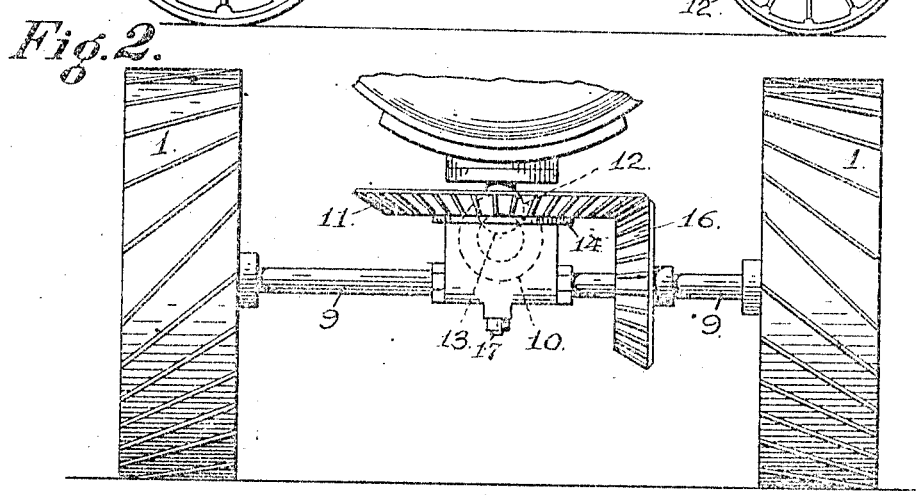
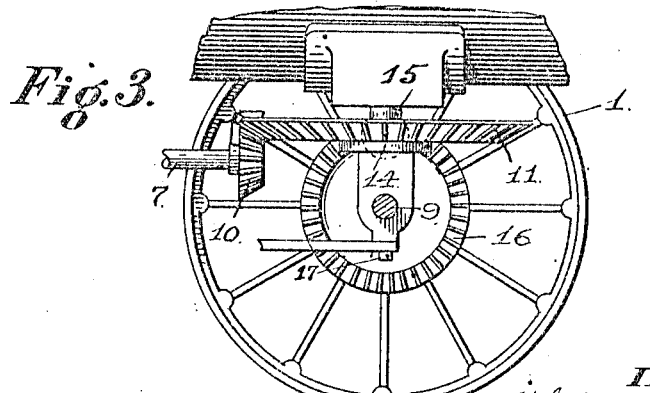
WITNESSES.
Arthur L. Lee.
Tom Jacobsen.
INVENTOR.
Miladin Bunyetin
by Medina and Griffin
ATTYS

UNITED STATES PATENT OFFICE.

MILADIN BUNYETIN, OF BAKERSFIELD, CALIFORNIA.

TRACTION-ENGINE.

949,350.  Specification of Letters Patent.  Patented Feb. 15, 1910.

Application filed August 24, 1908. Serial No. 450,031.

*To all whom it may concern:*

Be it known that I, MILADIN BUNYETIN, a citizen of Hungary, residing at Bakersfield, in the county of Kern and State of California, have invented a new and useful Traction-Engine, of which the following is a specification in such full and clear terms as will enable those skilled in the art to construct and use the same.

This invention relates to a means for driving the forward trucks of a traction engine, the object of the invention being to provide means to drive the front wheels of the engine as well as the rear wheels.

In the drawings in which the same numeral is applied to the same portion throughout, Figure 1 is a side elevation of an engine equipped with the invention, Fig. 2 is a front view of the engine showing the front wheels and the front driving gear only, and Fig. 3 is a view of the front driving gear with one of the wheels of the engine broken away to show the gears more clearly.

The numeral 1 is applied to the front drive wheels and 2 is applied to the rear wheels. The engine is shown at 4 and drives directly to the rear wheels by means of the inclined shaft 5. This shaft has a bevel gear in connection with a bevel gear on the rear axle, and near the center of said rear axle there is a gear which is in mesh with the gear 6 on the rear end of a longitudinal shaft 7, said shaft passing through an open pipe in the water tank 8 and passing to a point near the front axle 9. The shaft 7 has a gear 10 on its front end which meshes with a large bevel gear 11 carried by the front axle and having as its center the center of the king bolt 12. This king bolt is a large ball seated in a spherical bearing 13 in the center of the axle, the member having said spherical bearing being the axle for the large bevel gear 11. A collar 14 and a collar 15 hold the bevel gear 11 in its proper place in mesh with the gear 16 secured to the axle of the front wheels.

Below the front axle there is a stub shaft 17 which is secured to the reach of the engine, the object being to prevent the front axle from tipping from front to rear and either or both lifting the bevel gear 11 out of the teeth of the small gear 10, or breaking either of the gears. It will be noted that the center of motion of the small gear on the longitudinal shaft is but slightly below the center of motion of the spherical ball on which the boiler rests, and the point of the cone of the small gear 10 is vertically over the front axle, thus making it possible to move the front axle through all the angles necessary to its travel over the country without injury in any way to the driving gears.

Having thus described my invention what I claim as new and desire to secure by Letters Patent of the United States is as follows:

1. In a traction engine, the combination of a boiler and engine, a ball king bolt depending from the boiler, a horizontal axle at the front and at the rear, means to turn the front axle in a horizontal plane, means to drive the rear axle direct from the engine, a gear carried by the rear axle and in mesh with a gear on a shaft extending longitudinally of the engine under the boiler thereof, a gear at the front end of said shaft, a horizontal gear carried above front axle and lying substantially in the plane of the center of the ball of the king bolt and surrounding the same, a gear secured to the front axle and in mesh with the horizontal gear, and means to prevent the horizontal gear from getting out of mesh with the gear on the longitudinal shaft.

2. In a traction engine, the combination of a boiler, an engine, a ball king bolt depending from the boiler, a horizontal axle at the front and the rear of the boiler, means to drive the rear axle from the engine, a longitudinal shaft having a gear wheel at its front and rear, a gear carried by the front axle, a substantially horizontal gear carried above the front axle, and having its axis in the axis of the ball king bolt, and surrounding said ball, said gear in mesh with the gear on said axle, and with one of the gears on the longitudinal shaft, means to prevent the horizontal gear from getting out of mesh with the gear on the front end of the longitudinal shaft, means to drive said longitudinal shaft and means to move the front axle in a horizontal plane whereby the engine may be steered over a road, substantially as set forth.

In testimony whereof I have set my hand this 17 day of August A. D. 1908, in the presence of the two subscribed witnesses.

MILADIN BUNYETIN.

Witnesses:
  CHAS. P. CLARK,
  E. L. FOSTER.